US011225883B2

(12) United States Patent
Albers

(10) Patent No.: US 11,225,883 B2
(45) Date of Patent: Jan. 18, 2022

(54) TURBOMACHINE HOUSING ELEMENT

(71) Applicant: MTU Aero Engines AG, Munich (DE)

(72) Inventor: Lothar Albers, Munich (DE)

(73) Assignee: MTU Aero Engines AG, Munich (DE)

(*) Notice: Subject to any disclaimer, the term of this patent is extended or adjusted under 35 U.S.C. 154(b) by 486 days.

(21) Appl. No.: 15/877,469

(22) Filed: Jan. 23, 2018

(65) Prior Publication Data

US 2018/0209301 A1 Jul. 26, 2018

(30) Foreign Application Priority Data

Jan. 23, 2017 (EP) .................................. 17152728.6

(51) Int. Cl.
*F01D 25/14* (2006.01)
*F01D 11/18* (2006.01)
(Continued)

(52) U.S. Cl.
CPC ............ *F01D 25/145* (2013.01); *B33Y 80/00* (2014.12); *F01D 9/04* (2013.01); *F01D 11/08* (2013.01);
(Continued)

(58) Field of Classification Search
CPC .......... F01D 25/145; F01D 9/04; F01D 25/26; F01D 25/246; F01D 25/14; F01D 25/12;
(Continued)

(56) References Cited

U.S. PATENT DOCUMENTS 2,634,375 A * 4/1953 Guimbal .............. H02K 7/1823
290/52
4,497,610 A * 2/1985 Richardson ............... F01D 9/04
415/116
(Continued)

FOREIGN PATENT DOCUMENTS

DE 10 2010 045 712 B4 3/2013
EP 0713977 5/1996
(Continued)

OTHER PUBLICATIONS

Engineering toolbox, Thermal conductivity of some common materials and gases, Jul. 22, 2011, www.Engineeringtoolbox.com (Year: 2011).*
(Continued)

*Primary Examiner* — David Hamaoui
*Assistant Examiner* — Andrew J Marien
(74) *Attorney, Agent, or Firm* — Davidson, Davidson & Kappel, LLC

(57) ABSTRACT

A turbomachine housing element, having a flow channel for accommodating a rotor blade assembly and a first cavity at least partially produced by primary shaping; the first cavity being adapted for passive thermal insulation and/or the assemblable turbomachine housing element not being adapted for the active circulation of fluid through the first cavity; and/or, between the first cavity and the flow channel, a separate seal being attached to turbomachine housing element; and/or the first cavity extending in the axial direc-
(Continued)

tion of the flow channel over at least 20% of a minimum axial length of the turbomachine housing element at the level of the cavity and/or over a minimum axial length of the separate seal and/or being filled with air or a thermally insulating fluid, whose specific thermal conductivity λ is at least 10% lower than the specific thermal conductivity λ of air.

19 Claims, 2 Drawing Sheets

(51) Int. Cl.
    *F04D 29/58* (2006.01)
    *F04D 29/52* (2006.01)
    *F04D 29/16* (2006.01)
    *B33Y 80/00* (2015.01)
    *F01D 25/24* (2006.01)
    *F01D 11/12* (2006.01)
    *F01D 9/04* (2006.01)
    *F01D 25/26* (2006.01)
    *F01D 25/12* (2006.01)
    *F01D 11/08* (2006.01)
    *F01D 11/24* (2006.01)

(52) U.S. Cl.
    CPC .......... *F01D 11/122* (2013.01); *F01D 11/127* (2013.01); *F01D 11/18* (2013.01); *F01D 11/24* (2013.01); *F01D 25/12* (2013.01); *F01D 25/14* (2013.01); *F01D 25/24* (2013.01); *F01D 25/246* (2013.01); *F01D 25/26* (2013.01); *F04D 29/164* (2013.01); *F04D 29/526* (2013.01); *F04D 29/5853* (2013.01); *F05D 2220/32* (2013.01); *F05D 2230/31* (2013.01); *F05D 2260/231* (2013.01)

(58) Field of Classification Search
    CPC ...... F01D 11/18; F01D 25/24; F04D 29/5853; B33Y 80/00; F05D 2260/231; F05D 2230/31; F05D 2220/32
    See application file for complete search history.

(56) References Cited

U.S. PATENT DOCUMENTS

| | | | | |
|---|---|---|---|---|
| 4,679,981 A | * | 7/1987 | Guibert | F01D 11/08 415/116 |
| 5,238,365 A | * | 8/1993 | Petsche | F01D 9/00 415/170.1 |
| 5,375,973 A | | 12/1994 | Sloop et al. | |
| 5,414,714 A | * | 5/1995 | Gladden | G01R 31/317 324/750.3 |
| 5,562,408 A | * | 10/1996 | Proctor | F01D 11/24 415/173.1 |
| 5,630,702 A | | 5/1997 | Marmilic et al. | |
| 6,116,852 A | * | 9/2000 | Pierre | F01D 11/24 415/115 |
| 6,146,091 A | * | 11/2000 | Watanabe | F01D 9/04 415/111 |
| 6,340,285 B1 | * | 1/2002 | Gonyou | F01D 11/005 415/116 |
| 6,655,911 B2 | * | 12/2003 | Bekrenev | F01D 9/042 415/116 |
| 7,147,429 B2 | * | 12/2006 | Czachor | F01D 5/143 415/9 |
| 7,306,424 B2 | * | 12/2007 | Romanov | F01D 11/08 415/115 |
| 7,665,955 B2 | * | 2/2010 | Liang | F01D 11/24 415/115 |
| 7,748,959 B1 | * | 7/2010 | Pinera | F01D 5/08 416/244 A |
| 8,317,461 B2 | * | 11/2012 | Tholen | F01D 11/08 415/115 |
| 9,115,600 B2 | * | 8/2015 | Wiebe | F01D 25/24 |
| 9,416,675 B2 | * | 8/2016 | Lacy | F01D 11/005 |
| 9,464,538 B2 | * | 10/2016 | Sezer | F01D 11/24 |
| 10,107,128 B2 | * | 10/2018 | Romanov | F01D 11/08 |
| 2001/0006601 A1 | * | 7/2001 | Wilson | F01D 5/085 416/95 |
| 2006/0193721 A1 | * | 8/2006 | Adam | F01D 25/145 415/177 |
| 2011/0173991 A1 | * | 7/2011 | Dean | F01D 1/32 60/801 |
| 2014/0072407 A1 | * | 3/2014 | Harron | F01D 5/16 415/119 |
| 2015/0226076 A1 | | 8/2015 | Nuovo et al. | |
| 2016/0097285 A1 | * | 4/2016 | Harding | F01D 5/186 60/752 |
| 2016/0297002 A1 | * | 10/2016 | Thomas | B22F 3/26 |
| 2016/0326900 A1 | | 11/2016 | Borja et al. | |
| 2016/0332229 A1 | * | 11/2016 | Snyder | F01D 25/12 |
| 2017/0114670 A1 | * | 4/2017 | Shapiro | F01D 25/24 |
| 2017/0189966 A1 | * | 7/2017 | Giannozzi | B33Y 80/00 |
| 2017/0191425 A1 | * | 7/2017 | Miranda | F01D 25/12 |
| 2017/0204742 A1 | * | 7/2017 | Swift | F01D 11/08 |
| 2018/0038238 A1 | * | 2/2018 | Ribarov | F01D 11/20 |

FOREIGN PATENT DOCUMENTS

| | | |
|---|---|---|
| EP | 0974734 A2 | 1/2000 |
| EP | 2194235 | 6/2010 |

OTHER PUBLICATIONS

"Thermal Conductivity of some common Materials and Gases", Oct. 27, 2016, Engineering Toolbox.com (Year: 2016).*

* cited by examiner

TURBOMACHINE HOUSING ELEMENT

This claims the benefit of European Patent Application EP 17152728.6, filed Jan. 23, 2017 and hereby incorporated by reference herein.

The present invention relates to a turbomachine housing element, a turbomachine, especially a gas turbine having the turbomachine housing element, as well as to a method for manufacturing the turbomachine housing element, and to a method for operating the turbomachine.

BACKGROUND

From the German Patent Application DE 10 2010 045 712 B4 of the Applicant, a turbomachine housing is known that is at least partially produced in an additive manufacturing process and that has one or a plurality of control channels in which cooling or heating fluid is circulated to actively control the temperature of the turbomachine housing. The purpose here, namely, is to eliminate the need for a ring between the turbomachine housing and a rotor blade assembly.

SUMMARY OF THE INVENTION

It is an object of an embodiment of the present invention to enhance a turbomachine, especially the manufacture and/or operation thereof.

The present invention provides a turbomachine housing element, a turbomachine having a turbomachine housing element and a method for the manufacture and/or operation thereof.

In an embodiment of the present invention, a turbomachine housing element, namely for a compressor stage or turbine stage of a gas turbine, in fact, at least one turbomachine housing element of a turbomachine, specifically of a compressor stage or turbine stage of a gas turbine, has (at least) one flow channel, in which one or a plurality of rotor blade assemblies is/are accommodated, and, as the case may be, is/are provided, specifically adapted for that purpose. In an embodiment, a rotor blade assembly includes one or a plurality of rotor blades, namely a bladed and rotatably (mounted) rotor.

In an embodiment of the present invention, the turbomachine housing element has (at least) the cavity or one or more of the further cavities, in one variant, at most six of the cavities clarified in greater detail below; in the present case, without limiting generality, the cavity or one of these cavities being referred to as the first cavity and, if indicated, the other as the further cavity or cavities.

In an embodiment of the present invention, the first cavity and, in another embodiment, the or one or more of the further cavities, or the wall thereof is/are produced (in each instance) completely or partially by primary shaping, specifically casting, or especially by an additive manufacturing process, where or in which, in an embodiment, at least the wall; in an embodiment, the complete turbomachine housing element is produced or built up layer by layer by local, namely by chemical and/or physical, more specifically by optical and/or thermal solidification of formless, especially liquid, pasty or loose and, accordingly, bulky, especially pulverant or granular feedstock, more specifically metal, plastic and/or ceramic, and/or by bonding to a subjacent layer, especially by selective laser melting, laser sintering, electron beam melting or the like.

In an embodiment of the present invention, the first and, in another embodiment, the one cavity or more of the further cavities is/are each specifically adapted or used for thermal insulation only, and/or fluid is not actively circulated through this cavity or these cavities in any steady-state and/or transient operating condition (of the turbomachine), specifically not (actively) fed and/or discharged and/or circulated; that is the assemblable, especially assembled and/or ready-for-operation turbomachine housing element is not adapted or used for active circulation, specifically for (active) feeding and/or discharging and/or circulating of fluid into, out of or through this cavity or these cavities.

In contrast to an active temperature control where cooling or heating fluid is actively circulated through control channels, this is based in an embodiment on the approach of providing a passive thermal insulation through the use of the cavity or cavities, which is/are not actively traversed by flow, making it possible to reduce and/or retard a thermal conduction in the turbomachine housing element, especially away from the flow channel, specifically radially or orthogonally away therefrom—relative to an axial direction of the flow channel—, and, in fact, thereby making it possible to adapt a thermal expansion of the turbomachine housing element to that of the rotor blade assembly or assemblies accommodated in the flow channel thereof.

An embodiment of the present invention also provides that a single-piece or composite seal, especially an abradable liner and/or a honeycomb seal that is manufactured separately from this cavity or these cavities, that is (configured) separately from this cavity or these cavities, and is referred to accordingly in the present case as a separate seal, be attached to the turbomachine housing element between the first cavity and the flow channel and, in a further embodiment, between (a configuration) of the first cavity and of the one cavity or more of the further cavities, on the one hand, and the flow channel, on the other hand, namely by form-locking engagement, friction-locking engagement, and/or in a material-to-material bond.

In contrast to eliminating the need for a sacrificial ring due to an active temperature control where cooling or heating fluid is actively circulated through control channels, this is based in an embodiment on the approach of providing or enhancing a passive thermal insulation through the use of the seal, in fact, in addition to this cavity or these cavities, making it possible to reduce and/or retard a thermal conduction in the turbomachine housing element, especially away from the flow channel, specifically radially or orthogonally away therefrom—relative to an axial direction of the flow channel—, and especially thereby making it possible to (further) adapt a thermal expansion of the turbomachine housing element to that of the rotor blade assembly or assemblies accommodated in the flow channel thereof.

Additionally or alternatively, in an embodiment of the present invention, the first cavity and, in a further embodiment, the or more of the further cavities (in each instance) extend(s) in the axial direction of the flow channel over at least 20%, especially at least 50%, especially at least 60%, especially at least 75%, of a minimal axial length of the turbomachine housing element at the level of this (specific) cavity and/or of a minimal axial length of the separate seal.

In contrast to an active temperature control where cooling or heating fluid is actively circulated through narrow control channels, between which wide thermal bridges are formed for absorbing or dissipating heat, this is based in an embodiment on the approach of providing or enhancing a passive thermal insulation, making it possible to reduce and/or retard a thermal conduction in the turbomachine housing element, especially away from the flow channel, specifically radially or orthogonally away therefrom—relative to an axial direction of the flow channel—, and especially thereby making it possible to (further) adapt a thermal expansion of the turbomachine housing element to that of the rotor blade assembly or assemblies accommodated in the flow channel thereof.

Additionally or alternatively, in an embodiment of the present invention, the first cavity and, in a another embodiment, the one cavity or more of the further cavities is/are filled, especially in a steady-state operation, with a thermally insulating fluid whose specific thermal conductivity $\lambda$, specifically measured in [W/m·K] and/or at 0° C. and/or in accordance with DIN 4108-4, is at least 10% lower than specific thermal conductivity $\lambda$ of air, in fact at least 10% lower than 0.026 W/m·K.

In contrast to an active temperature control where cooling or heating fluid is actively circulated, that, for this purpose, is inherently supposed to have a highest possible thermal conductivity, this is based in an embodiment on the approach of providing or enhancing a passive thermal insulation, making it possible to reduce and/or retard a thermal conduction in the turbomachine housing element, especially away from the flow channel, specifically radially or orthogonally away therefrom—relative to an axial direction of the flow channel—, and especially thereby making it possible to (further) adapt a thermal expansion of the turbomachine housing element to that of the rotor blade assembly or assemblies accommodated in the flow channel thereof.

In another embodiment of the present invention, the first cavity and, in a further embodiment, the one cavity or more of the further cavities is/are (each) filled with air, especially in a steady-state operation. In an embodiment, this makes it possible to realize an especially simple thermal insulation.

In an embodiment, the volumes of the first cavity and the one cavity or more of the further cavities and/or the volumes of two or more of the further cavities (each) differ by at least 1%, more specifically by at least 2%, more specifically by at least 10%, and/or at most by 200%, more specifically by at most 100%, more specifically by at most 50%.

In contrast to an active temperature control where cooling or heating fluid is actively circulated through identically constructed control channels, this is based in an embodiment on the approach of adapting a passive thermal insulation in a way that makes it possible to reduce and/or retard a thermal conduction in the turbomachine housing element, especially away from the flow channel, specifically radially or orthogonally away therefrom—relative to an axial direction of the flow channel, and especially thereby making it possible to (further) adapt a thermal expansion of the turbomachine housing element to that of the rotor blade assembly or assemblies accommodated in the flow channel thereof.

In an embodiment, the turbomachine housing element does not have any channel extending from the first cavity and/or any channel from the cavity or one or more of the further cavities to a surface of the turbomachine housing element. In other words, this cavity or these cavities may be sealed off.

In contrast to the feeding and discharging of cooling or heating fluid into and out of the control channel or control channels, respectively, it is possible to advantageously reduce the outlay for equipment and/or (dis)assembly.

In an embodiment, the turbomachine housing element has only or at most one channel extending from the first cavity and/or (in each case) only or at most one channel extending from the cavity or one or more of the further cavities to a surface of the turbomachine housing element. In an embodiment, additionally or alternatively, (each) channel extending from the first cavity and/or from the and/or more of the further cavities to a surface of the turbomachine housing element features a minimum cross section that is traversable by flow, especially a cross-sectional area in a sectional view extending orthogonally to the longitudinal channel direction, that is at most 25%, especially at most 10% of this cavity's minimum cross section that is traversable by flow, especially a cross-sectional area of this cavity in a meridional section or a plane section that contains the axial direction of the flow channel and/or a (main) machine axis of the turbomachine.

In an embodiment, such individual and/or narrow (outlet) channels make it advantageously possible for residual material remaining from the additive manufacturing process to be discharged from the cavity or cavities and, at the same time, for a passive thermal insulation to be realized or enhanced, especially in the context of little outlay for manufacturing and/or assembly.

In a further embodiment, the channel or one or more of the channels extending to a surface of the turbomachine housing element may interconnect the first and the further cavity and/or two or more of the further cavities, and/or may end at a surface of the turbomachine housing element facing away from the flow channel.

In an embodiment, residual material remaining from the additive manufacturing process may be advantageously discharged from the cavity or cavities through such joint and/or outwardly leading (outlet) channels.

In an embodiment, the turbomachine housing element is manufactured in one piece or one part and/or annularly formed. Additionally or alternatively, the first cavity and/or one or more of the further cavities is/are annularly shaped.

In an embodiment, a passive thermal insulation may be hereby enhanced, making it possible to reduce and/or retard a thermal conduction, especially away from the flow channel, specifically radially or orthogonally away therefrom—relative to an axial direction of the flow channel —, and especially thereby making it possible to (further) adapt a thermal expansion of the turbomachine housing element to that of the rotor blade assembly or assemblies accommodated in the flow channel thereof.

As explained earlier, in an embodiment, the first cavity and/or the cavity or one or more of the further cavities is/are designed, especially in terms of the size, shape, number and/or position thereof, in the turbomachine housing element for passively adapting a thermal expansion of the turbomachine housing element to that of the rotor blade assembly.

BRIEF DESCRIPTION OF THE DRAWINGS

Further advantageous embodiments of the present invention will become apparent from the dependent claims and the following description of preferred embodiments. To this end, the drawing shows, partly in schematic form, in:

DETAILED DESCRIPTION

Figure 1:
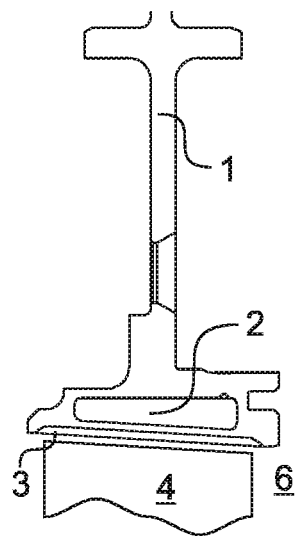
FIG. 1: a portion of a turbomachine having a turbomachine housing element in an embodiment of the present invention, in a meridional section.

In an embodiment of the present invention, FIG. 1 shows a portion of a turbomachine having an installed turbomachine housing element 1 in a meridional section that contains an axial direction or the main machine axis of the turbomachine (horizontally in FIG. 1).

Annularly shaped turbomachine housing element 1 has a flow channel 6 in which a rotor blade assembly 4 is accommodated.

Turbomachine housing element 1 is manufactured in one piece in an additive manufacturing process and features an annularly shaped, co-manufactured first cavity 2.

First cavity 2 is filled with air or a thermally insulating fluid whose specific thermal conductivity λ is at least 10% lower than specific thermal conductivity λ of air, air or thermally insulating fluid not being actively circulated through first cavity 2 in any steady-state or transient operating condition of the turbomachine; this cavity rather only being designed, adapted, used, or provided for passive thermal insulation.

Between first cavity 2 and flow channel 6, a separate seal, especially an abradable liner and/or a honeycomb seal 3, is attached to turbomachine housing element 1.

First cavity 2 extends in the axial direction of the flow channel (horizontally in FIG. 1) over approximately 85% of a minimum axial length of turbomachine housing element 1 at the level of cavity 2 and over approximately 70% of a minimum axial length of separate seal 3.

Figure 2:
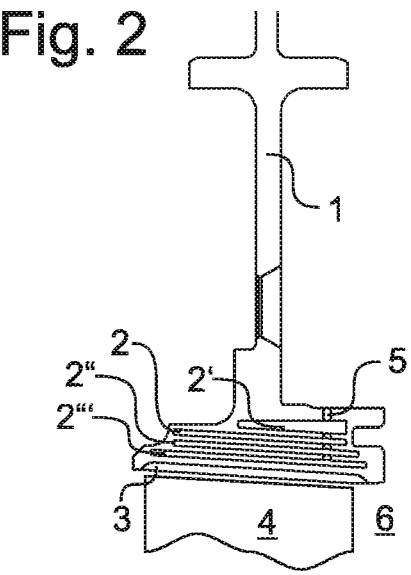
FIG. 2: a portion of a turbomachine having a turbomachine housing element in a further embodiment of the present invention in a view similar to that of FIG. 1.

In a further embodiment of the present invention, FIG. 2 shows a portion of a turbomachine having a turbomachine housing element 1 in a view similar to that of FIG. 1. Identical reference numerals identify corresponding features, so that reference is made to the preceding description, and the differences will be discussed below.

In addition to first cavity 2, whose size, shape and configuration are adapted to the turbomachine housing element, in the embodiment of FIG. 2, turbomachine housing element has three further cavities 2', 2", 2''' that are produced using the additive manufacturing process.

As is first cavity 2, these further cavities 2', 2", 2''' are also filled with air or a thermally insulating fluid whose specific thermal conductivity λ is at least 10% lower than specific thermal conductivity λ of air, air or thermally insulating fluid not being actively circulated through further cavities 2', 2", 2''' in any steady-state or transient operating condition of the turbomachine; rather these cavities only being designed, adapted, used, or provided for passive thermal insulation.

Further cavities 2', 2", 2''' extend in the axial direction of flow channel 6 in each case over a substantial portion of the minimum axial length of turbomachine housing element 1 at the level of the specific cavity and the minimum axial length of separate seal 3.

The volumes of at least two of cavities 2-2''' differ by at least 10% and at most by 50%.

Via one or a plurality of joint channels 5, each of whose minimum cross section is less than 10% of a minimum cross section of the smallest cavity that is traversable by flow, cavities 2-2''' communicate with a surface of turbomachine housing element 1 that faces away (above in FIG. 2) from the flow channel.

In the embodiment of FIG. 1, as well, one or more such channels extending from first cavity 2 to a surface of turbomachine housing element that faces away from the flow channel may be provided that are not discernible in the sectional view of FIG. 1.

Figure 3:
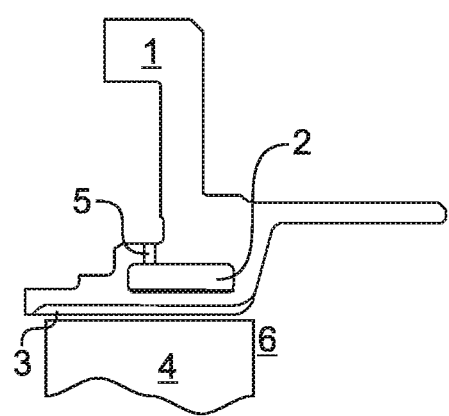
FIG. 3: a portion of a turbomachine having a turbomachine housing element in a further embodiment of the present invention in a view similar to that of FIG. 1, 2.

FIG. 3 shows a portion of a turbomachine having a turbomachine housing element 1 in accordance with a further embodiment of the present invention in a view that corresponds to that of FIG. 1, 2. Identical reference numerals identify corresponding features, so that reference is made to the preceding description, and the differences will be discussed below.

In the embodiment of FIG. 3, differently contoured turbomachine housing element 1 only has a (first) cavity 2, as in the embodiment of FIG. 1, that communicates via one or more joint channels 5 with a surface (above in FIG. 3) of turbomachine housing element 1 that faces away from the flow channel.

Although exemplary embodiments are explained in the preceding description, it should be noted that many modifications are possible.

Figure 4:
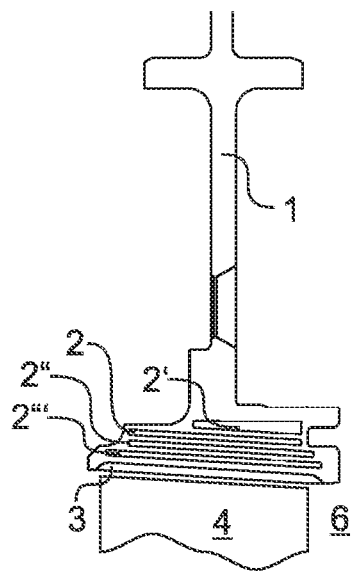
FIG. 4: a portion of a turbomachine having a turbomachine housing element in a further embodiment of the present invention in a view similar to that of FIG. 2, without channels.

Thus, in a modification, first cavity 2 and/or further cavities 2', 2", 2''' may each be sealed off, or the need for channels 5 is eliminated as shown in FIG. 4, in fact, in that, if indicated, to remove residual material remaining from the additive manufacturing process, passages used for the assemblable or finished turbomachine housing element are sealed. Accordingly, in the present case, a channel is understood, namely, to be a passage that is at least temporarily open or provided or specifically adapted for that purpose, in any case in the assemblable state or operation.

It should be appreciated, moreover, that the exemplary embodiments are merely examples and are in no way intended to restrict the scope of protection, the uses or the design. Rather, the foregoing description provides one skilled in the art with a guideline for realizing at least one exemplary embodiment; various modifications being possible, particularly with regard to the function and location of the described components, without departing from the scope of protection as is derived from the claims and the combinations of features equivalent thereto.

REFERENCE NUMERAL LIST 1 turbomachine housing element
2 first cavity
2', 2", 2''' further cavity
3 abradable liner/honeycomb seal (seal)
4 rotor blade assembly
5 channel
6 flow channel

What is claimed is:

1. A turbomachine housing element for a compressor stage or turbine stage of a gas turbine, comprising:
 a flow channel for accommodating at least one rotor blade assembly;
 a first cavity at least partially produced in an additive manufacturing process; the first cavity being adapted for passive thermal insulation, the turbomachine housing element, when assembled in the compressor stage or turbine stage of the gas turbine, not being adapted for the active circulation of fluid through the first cavity, the first cavity being filled either with air or with a thermally insulating fluid, whose specific thermal conductivity λ is at least 10% lower than a specific thermal conductivity λ of air; and
 at least one further cavity produced at least partially by the additive manufacturing process, the at least one further cavity being adapted for passive thermal insulation, the turbomachine housing element, when assembled in the compressor stage or turbine stage of the gas turbine, not being adapted for active circulation of fluid through the at least one further cavity;

wherein no channel extends from the first cavity to a surface of the housing machine element; and a separate seal between the flow channel and the at least one further cavity, the separate seal attached to the turbomachine housing element and sealing the at least one further cavity from the flow channel.

2. The turbomachine housing element as recited in claim 1, wherein the at least one further cavity extends in the axial direction of the flow channel over at least 20% of a minimum axial length of the turbomachine housing element at a level of the further cavity; or extends over a minimum axial length of the separate seal and is filled either with air or with the thermally insulating fluid or with another thermally insulating fluid whose specific thermal conductivity λ is at least 10% lower than the specific thermal conductivity λ of air.

3. The turbomachine housing element as recited in claim 1, wherein the at least one further cavity extends in axial direction of the flow channel over at least 50% of a minimal axial length of the turbomachine housing element at the level of this at least one further cavity and of a minimal axial length of the separate seal.

4. The turbomachine housing element as recited in claim 1 wherein the at least one further cavity numbers at most five further cavities.

5. The turbomachine housing element as recited in claim 1 wherein the turbomachine housing element is manufactured in one piece.

6. The turbomachine housing element as recited in claim 1 wherein the turbomachine housing element or the first cavity or the at least one further cavity is annularly shaped.

7. The turbomachine housing element as recited in claim 1 wherein the first cavity or the at least one further cavity are designed for passively adapting a thermal expansion of the turbomachine housing element to that of the rotor blade assembly.

8. A turbomachine comprising: said at least one turbomachine housing element as recited in claim 1, and said at least one rotor blade assembly accommodated in the flow channel.

9. A gas turbine comprising the turbomachine as recited in claim 8.

10. A compressor stage or turbine stage of a gas turbine comprising the turbomachine as recited in claim 8.

11. The turbomachine housing element as recited in claim 1 wherein, between the cavity and the flow channel, a separate seal is attached to the turbomachine housing element.

12. The turbomachine housing element as recited in claim 11 wherein the cavity extends in the axial direction of the flow channel over at least 20% of a minimum axial length of the separate seal.

13. A method for operating a turbomachine having the turbomachine housing element as recited in claim 1, the method comprising: passing fluid through the flow channel while the fluid is not actively circulated through the first cavity in any steady-state or transient operating condition.

14. The turbomachine housing element as recited in claim 1 wherein a volume of the first cavity and the at least one further cavity differ by at least 1% and at most 200%.

15. The turbomachine housing element as recited in claim 1 wherein the first cavity or the at least one further cavity extend in the axial direction of the flow channel over at least 20% of a minimum axial length of the turbomachine housing element at a level of the cavity or the at least one further cavity.

16. The turbomachine housing element as recited in claim 1 wherein the first cavity is filled with air.

17. The turbomachine housing element as recited in claim 1 wherein the at least one further cavity is filled with a thermally insulating fluid, whose specific thermal conductivity λ is at least 10% lower than a specific thermal conductivity λ of air.

18. A turbomachine housing element for a compressor stage or turbine stage of a gas turbine, comprising:

a flow channel for accommodating at least one rotor blade assembly;

a first cavity at least partially produced in an additive manufacturing process; the first cavity being adapted for passive thermal insulation, the turbomachine housing element, when assembled in the compressor stage or turbine stage of the gas turbine, not being adapted for the active circulation of fluid through the first cavity, the first cavity being filled either with air or with a thermally insulating fluid, whose specific thermal conductivity λ is at least 10% lower than a specific thermal conductivity λ of air; and at least one further cavity produced at least partially by the additive manufacturing process, the at least one further cavity being adapted for passive thermal insulation, the turbomachine housing element, when assembled in the compressor stage or turbine stage of the gas turbine, not being adapted for active circulation of fluid through the at least one further cavity, wherein no channel extends from the at least one further cavity to a surface of the turbomachine housing element; and a separate seal between the flow channel and the at least one further cavity, the separate seal attached to the turbomachine housing element and sealing the at least one further cavity from the flow channel.

19. The turbomachine housing element as recited in claim 1 wherein the at least one further cavity extends over a minimum axial length of the separate seal and is filled either with air or with the thermally insulating fluid or with another thermally insulating fluid whose specific thermal conductivity λ is at least 10% lower than the specific thermal conductivity λ of air.

* * * * *